(No Model.)
H. M. HALL.
JOINT FOR PIPES, &c.
No. 327,793. Patented Oct. 6, 1885.
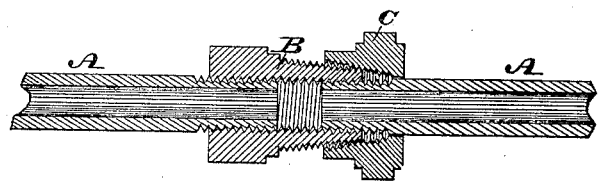
WITNESSES:
A. P. Grant,
W. F. Kircher
INVENTOR
Henry M. Hall
BY John A. Diedersheim
ATTORNEY.

UNITED STATES PATENT OFFICE.

HENRY M. HALL, OF PHILADELPHIA, PENNSYLVANIA.

JOINT FOR PIPES, &c.

SPECIFICATION forming part of Letters Patent No. 327,793, dated October 6, 1885.

Application filed April 17, 1885. Serial No. 162,527. (No model.)

*To all whom it may concern:*

Be it known that I, HENRY M. HALL, a citizen of the United States, residing in the city and county of Philadelphia, State of Pennsylvania, have invented a new and useful Improvement in Joints for Pipes, &c., which improvement is fully set forth in the following specification and accompanying drawing, in which the figure represents a section of a joint embodying my invention.

My invention consists of a joint for a pipe, rod, &c., whereby leakage thereat is prevented.

Referring to the drawing, A represents a piece of pipe, rod, shaft, valve-stem, &c., on which is fitted an exteriorly-threaded unsplit or solid sleeve or socket, B, which primarily freely embraces said piece A.

C represents an exteriorly-threaded nut for compressing said sleeve B upon the piece A, the threads of the two parts being fine.

The exterior surface of the sleeve B and the interior opening of the nut are tapering, but the tapers are at a different angle or pitch, the pitch of the opening of the nut being greater than that of the surface of the sleeve.

When the nut is fitted to the sleeve and rotated thereon, it engages with the threads thereof and climbs on said sleeve, the narrowest portion of its diameter, which is considerably less than that of the narrow end of the sleeve, gradually tightening against said end and adjacent portion of the sleeve, so that by a few turns of said nut the sleeve is forcibly compressed against the piece A uniformly around the same, thus closing the joint between the sleeve and piece in a tight and reliable manner and preventing leakage thereat.

When the sleeve is relieved of the nut, it springs sufficiently to permit its removal from the piece A.

Having thus described my invention, what I claim as new, and desire to secure by Letters Patent, is—

A pipe, rod, &c., in combination with the socket B, fitting on the outside of the said pipe, and having a tapering outside screw-threaded portion, and a nut, C, having its interior opening threaded and tapering, but of greater pitch than the taper of the said socket, said parts being arranged, combined, and operating substantially as and for the purpose set forth.

HENRY M. HALL.

Witnesses:
JOHN A. WIEDERSHEIM,
A. P. GRANT.